United States Patent [19]

Duffy

[11] Patent Number: 4,562,421
[45] Date of Patent: Dec. 31, 1985

[54] BRAKE WEAR SENSOR

[76] Inventor: Dennis A. Duffy, 5806 Hayter Ave., Lakewood, Calif. 90712

[21] Appl. No.: 462,537

[22] Filed: Jan. 31, 1983

[51] Int. Cl.⁴ .................................................. B60Q 1/100
[52] U.S. Cl. .................................... 340/52 A; 188/79; 200/61.4; 200/61.44
[58] Field of Search ............ 340/52 A, 81 R; 188/79; 200/61.4, 61.44

[56] References Cited

U.S. PATENT DOCUMENTS

| | | | |
|---|---|---|---|
| 2,831,176 | 4/1958 | Liberto | 340/81 R |
| 3,902,158 | 8/1975 | Dahlkvist | 340/52 A |
| 3,958,445 | 5/1976 | Howard et al. | 340/52 A |
| 4,016,533 | 4/1977 | Ishikawa et al. | 340/52 A |
| 4,231,012 | 10/1980 | Carré et al. | 340/52 A |
| 4,298,857 | 11/1981 | Robins | 340/52 A |
| 4,318,458 | 3/1982 | Dozsch et al. | 340/52 A |
| 4,391,350 | 7/1983 | Moriya | 340/52 A |
| 4,437,547 | 3/1984 | Harmer | 340/52 A |

Primary Examiner—John W. Caldwell, Sr.
Assistant Examiner—Tyrone Queen
Attorney, Agent, or Firm—Paul T. Loef

[57] ABSTRACT

Drum brake wear sensor system which senses brake wear and lights a warning light when lining wear reaches a predetermined amount.

3 Claims, 3 Drawing Figures

BRAKE WEAR SENSOR

BACKGROUND OF THE INVENTION

This invention relates to vehicular drum-type brakes, and more specifically to a drum brake wear sensor system which senses break lining wear and lights a warning light when the lining wear reaches a predetermined amount.

Most motor vehicles utilize drum-type hydraulic brake systems. Included are industrial vehicles like fork lifts, tugs, cranes as well as trucks and passenger vehicles or automobiles. Drum-type brakes require regular inspection to permit replacement of the brake lining before the rivets which attach the lining to the brake backing shoes engage the brake drum, scoring the drum. In the case of bonded brakes the brake shoes themselves will engage the drum with excessive wear of the lining. Due to the complexity and expense of inspecting brakes on many trucks and industrial vehicles the brakes are usually replaced either prematurely or after the drum and shoes have been ruined because of metal-to-metal contact as a result of excessive brake lining wear.

It is a principle object of this invention to reduce premature brake drum wear caused by brake rivets and backing shoes engaging one another as a result of excessive wearing of the brake lining.

A further object of this invention is to minimize vehicular maintenance costs by eliminating the necessity of inspecting drum-type brakes for brake lining wear.

It is a still further object of this invention to provide a brake wear sensor which can be applied either at the time of original equipment manufacture or as an after market device by installing the sensor in an existing fastener which attaches the lining to the brake backing shoe.

SUMMARY OF THE INVENTION

In summary, the brake wear sensor of this invention accomplishes the above objects by providing an electrically conductive sensor installed below the drum engaging surface of the brake shoe lining and above the supporting metal structure of the backing shoe in combination with an electrical circuit which lights a warning lamp when the sensor engages the brake drum as a result of brake shoe lining wear.

In the preferred embodiment the sensor is installed in a hollow rivet which attaches the lining to the brake backing shoe, or in the case of solid rivets the rivet is drilled out to accommodate the sensor.

BRIEF DESCRIPTION OF THE DRAWINGS

With reference to the drawings, wherein like reference numerals designate like portions of the invention.

DESCRIPTION OF THE PREFERRED EMBODIMENT

Figure 1:
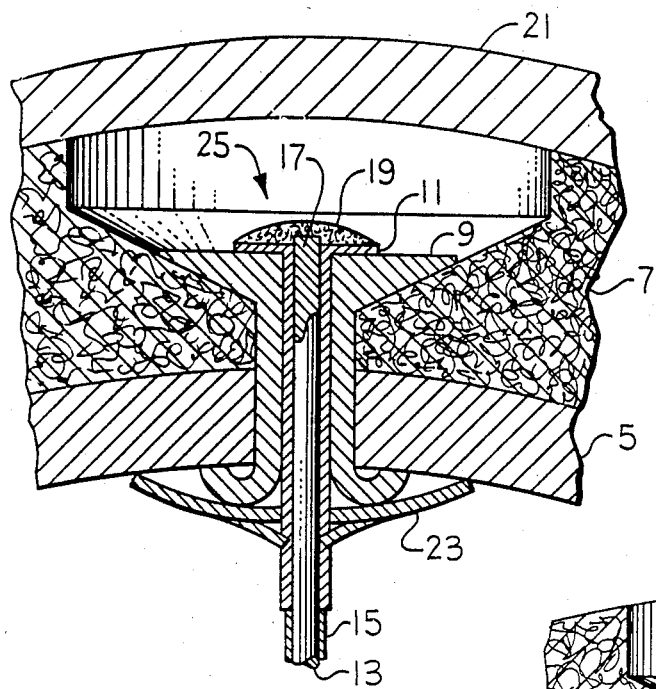
FIG. 1 is an enlarged section view of the brake wear sensor installed in a rivet fastener which attaches the brake lining to the backing shoe.

FIG. 1 shows an enlarged section view of a typical brake backing plate 5 to which is attached the brake lining 7 by the rivet 9. Typically the rivets 9 are hollow rivets and have an axial aperture or if a solid rivet is installed it may be drilled to accommodate the shouldered insulator 11 which also has an axial aperture. This aperture accommodates the conductive wire 13 which is stripped of its insulation 15 on the end portion and inserted and bonded to the axial aperature in the shoulder insulator 11. The bare end 17 must protrude above the shoulder portion of the shoulder-insulator 11. A wearable insulation material 19 is applied so as to cover the protruding portion of the conductor wire 13. This insulating material is necessary to prevent inadvertent shorting between the brake drum and the conductor wire 13 if metallic particles, as a result of drum and/or metallic lining wear, should collect in the space above the sensor so as to connect the conductor wire 13 with the drum through the metallic particles. Further, this insulation material 19 must be wearable or abradable so that as the lining 7 wears and the drum approaches the sensor and the shoe begins to engage the insulation material 19 it abrades or wears away without damaging the engaging brake drum. Wearable insulation material 19, based on tests, is best made from high temperature paint which fills the noted requirements. Push nut 23 is shown as a fastener means to retain the sensor in the brake shoe assembly.

Figure 3:
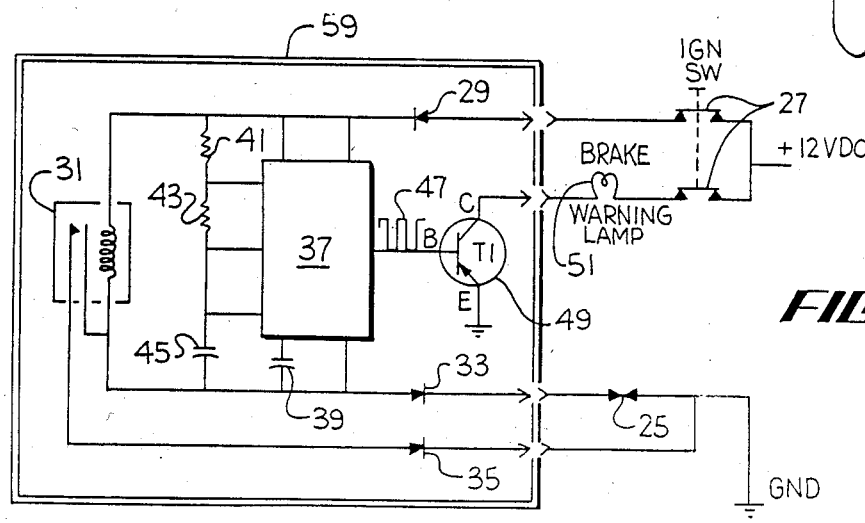
FIG. 3 shows a typical electrical circuit for lighting the warning lamp when the sensor engages the brake drum.

The sensor assembly 25 is connected in the electrical circuit of FIG. 3 as the "trigger" element 25 which is normally open until the brake lining 7 wears away and the brake drum 21 abrades the insulation material 19 and contacts the bare end 17 of the conductor wire 13 to close the circuit. As shown, a power source, commonly shown as twelve volts DC, which is connected to a two pole switch 27 which is closed through the vehicle's ignition switch. The first pole of the electrical switch 27 connects to the first diode 29 and then to the coil of the latching relay 31. The second diode 33 connects the normally open brake sensor 25 to ground. One contact of the latching relay 31 is connected to a third diode 35 and then to the common ground downstream of the sensor 25. A timer 37 is connected by a pair of legs in parallel connection to the latching relay 31. One of the legs contains a first capacitor 39. A third leg parallels the latching relay 31 and contains first and second resistors 41 and 43 and a third capacitor 45, each of which also connects, on both sides, to the timer 37. Although in the case of capacitor 45, the capacitor 39 is included between the connections to the timer. These resistors and capacitors control the pulse duration output of the timer 37 which is typically a "555" or a "7555" timer. The output of the timer is a square wave, as shown at 47, and is connected to a driver transistor 49, to the brake warning lamp 51, to the second pole of the two pole switch 27 and, finally, to the power source shown as twelve volts DC. Now, as the sensor 25 engages the brake drum 21, even though the initial contact is intermittent and skipping the latching relay 31 latches and the timer 37 is energized, producing a square wave output 47 so as to drive the warning lamp 51 in an on-/off fashion. The lamp is driven in this fashion until the ignition switch is opened so as to open the two pole switch 27 at which time the latching relay 31 unlatches. When the ignition switch is again closed the warning lamp does not relight until the brakes are applied so as to make contact between the sensor 25 and the brake drum 21, again engaging the latching relay, etc.

Figure 2:
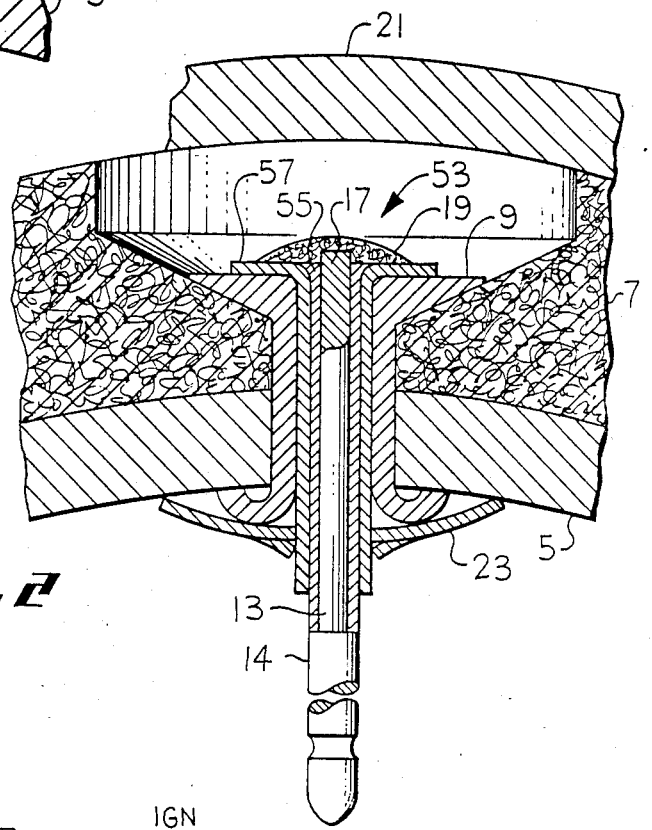
FIG. 2 is an alternate embodiment for the installed sensor.

FIG. 2 shows an alternative embodiment of the sensor assembly 53. In this embodiment the stripped end of the conductor wire 13 is adhesively attached to an insulation sleeve 55 which in turn is adhesively attached to a metallic shouldered sleeve 57 which is a more durable enclosure for the sensor. Otherwise the sensor parts are identical to those discussed above. The conductor wire 13 is shown terminated in a crimp-type connection 14 for connection at the enclosure box 59 to the second diode 33. Of course, in both embodiments the brake drum 21 must be connected to ground to complete the circuit.

The bare end 17 of a conductor wire 13 must be trimmed, in either embodiment, so as to protrude a slight amount above the surrounding insulation to assure good electrical contact with the brake drum 21.

Either of the two sensor assemblies 25 or 53 could be installed in bonded brake lining where the fastener 9 is omitted by drilling a small hole the diameter of the shoulder insulator 11 or the metallic shoulder sleeve 57 and spot facing to accommodate the shoulder diameter of either element, all to a suitable depth.

It may thus be seen that the brake wear sensor, depicted in the several embodiments of this invention, in combination with its electrical circuit solves the indicated problems encountered with normal vehicle drum-type brakes.

While particular embodiments of the invention have been described for purposes of illustration, it is to be understood that various changes and modifications can readily be made within the spirit of the invention. The invention, accordingly is not to be taken as limited except by the scope of the claims.

We claim:

1. An electrical sensor element for closing an electrical circuit when a drum type brake wear reaches a pre-determined amount, comprising:
   an insulated electrical conductor wire having said insulation removed at one end so as to expose the bare wire;
   a shouldered insulator sleeve enveloping and bonded to said bare end of said electrical conductor arranged so said bare end of said conductor wire protrudes above said shoulder on said insulator sleeve;
   abradable insulation material covering said exposed end of said bare wire and at least the contiguous portion of said shoulder on said shouldered insulation sleeve; and
   fastener means to slide over said sleeve portion of said shouldered insulation sleeve for retaining said sensor element in palce when installed.

2. The electrical sensor element of claim 1 further comprising a metal sleeve surrounding the sleeve portion of said shouldered insulator sleeve.

3. An electrical sensor element for closing an electrical circuit in a drum type brake assembly when brake wear reaches a pre-determined amount, comprising:
   an insulated electrical conductor wire having said insulation removed at one end so as to expose the bare wire;
   a shoulder insulator sleeve enveloping and bonded to said bare end of said electrical conductor arranged so said bare end of said conductor wire protrudes above said shoulder on said insulator sleeve;
   abradable insulation material covering said exposed end of said bare wire and at least the contiguous portion of said shoulder on said shouldered insulation sleeve; and
   a disconnect fitting, smaller in diameter than said sleeve portion of said shouldered insulator sleeve, attached to and terminating said insulated electrical conductor at the end opposite said shouldered insulator sleeve whereby said sensor element may be totally prefabricated and installed after manufacture of the brake assembly.

* * * * *